UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VIOLET WOOL-DYE.

1,004,107.  Specification of Letters Patent.  Patented Sept. 26, 1911.

No Drawing.  Application filed June 1, 1911.  Serial No. 630,645.

*To all whom it may concern:*

Be it known that I, PAUL THOMASCHEWSKI, doctor of philosophy, chemist, a citizen of the German Empire, residing at Vohwinkel, near Elberfeld, Germany, have invented new and useful Improvements in Violet Wool-Dye, of which the following is a specification.

My invention relates to new violet wool dyes which can be obtained by heating 1-alkylamino-4-arylamino-anthraquinones with urea and a condensing agent.

The dyes are produced most probably in accordance with the following equation:

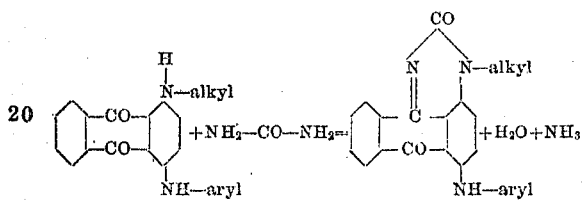

aryl=phenyl, tolyl, xylyl, etc., alkyl=methyl, ethyl, benzyl, etc. By treatment with sulfonating agents they are converted into the soluble sulfonic acids which are after being dried and pulverized in the shape of their alkaline salts violet powders soluble in water with a violet color and dyeing wool from acid baths fast violet shades.

In order to illustrate the new process more fully the following example is given, the parts being by weight: 10 parts of 1-methylamino-4-paratolylaminoanthraquinone, 10 parts of urea, 10 parts of ammonium chlorid and 60 parts of phenol are boiled together until a sample is soluble in pyridin with a violet color which is not changed to red by a further heating. 100 parts of alcohol are added and the precipitate thus obtained is filtered off and washed with alcohol and water. One part of the product thus obtained is dissolved in 10 parts of monohydrated sulfuric acid, fuming sulfuric acid is added until the mixture fumes and the melt is then heated to 50° C. until a sample is soluble in water. The melt is then introduced into 100 parts of ice water, heated, filtered off, neutralized with soda and dried. It is a violet powder being a sulfonic acid of a product having most probably the formula:

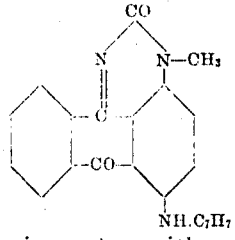

It is soluble in water with a violet color and dyes wool violet fast shades.

I claim:—

1. The herein described new dyes being sulfonic acids of compounds having most probably the formula:

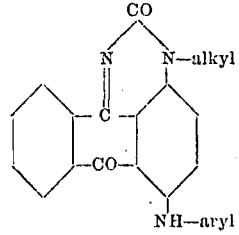

which are after being dried and pulverized in the shape of their alkaline salts violet powders soluble in water with a violet color; and dyeing wool violet fast shades, substantially as described.

2. The herein described new dye being a sulfonic acid of a product having most probably the formula:

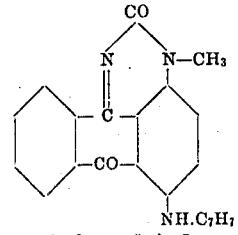

which is after being dried and pulverized in the shape of its sodium salt a violet powder, soluble in water with a violet color; and dyeing wool violet fast shades, substantially as described.

In testimony whereof I have hereunto set my hand in the presence of two subscribing witnesses.

PAUL THOMASCHEWSKI. [L. S.]

Witnesses:
 ALFRED HENKEL,
 ALBERT F. NUFER.